United States Patent
Nomaru

(10) Patent No.: US 9,289,853 B2
(45) Date of Patent: Mar. 22, 2016

(54) LASER BEAM APPLYING APPARATUS

(75) Inventor: Keiji Nomaru, Ota-Ku (JP)

(73) Assignee: Disco Corporation, Tokyo (JP)

( * ) Notice: Subject to any disclaimer, the term of this patent is extended or adjusted under 35 U.S.C. 154(b) by 507 days.

(21) Appl. No.: 13/536,236

(22) Filed: Jun. 28, 2012

(65) Prior Publication Data

US 2013/0001207 A1    Jan. 3, 2013

(30) Foreign Application Priority Data

Jul. 1, 2011 (JP) ................. 2011-147643

(51) Int. Cl.
| | |
|---|---|
| B23K 26/364 | (2014.01) |
| B23K 26/073 | (2006.01) |
| B23K 26/08 | (2014.01) |
| B23K 26/40 | (2014.01) |

(52) U.S. Cl.
CPC .......... *B23K 26/073* (2013.01); *B23K 26/0853* (2013.01); *B23K 26/0869* (2013.01); *B23K 26/364* (2015.10); *B23K 26/40* (2013.01); *B23K 2203/50* (2015.10)

(58) Field of Classification Search
CPC .................. B23K 26/4075; B23K 26/0869
USPC ............. 219/121.67, 121.72, 121.73, 121.75, 219/121.77, 121.68, 121.69
See application file for complete search history.

(56) References Cited

U.S. PATENT DOCUMENTS

| | | | |
|---|---|---|---|
| 4,904,068 A * | 2/1990 | Tatsuno et al. ............... | 359/559 |
| 2004/0013078 A1* | 1/2004 | Nagashima et al. .......... | 369/120 |
| 2008/0030882 A1* | 2/2008 | Ichikawa et al. ............. | 359/839 |

FOREIGN PATENT DOCUMENTS

| | | |
|---|---|---|
| JP | 3-114812 | 11/1991 |
| JP | 6-250008 | 9/1994 |
| JP | 2005-74479 | 3/2005 |
| JP | 2006-289388 | 10/2006 |
| JP | 2008-126283 | 6/2008 |
| JP | 2009-32698 | 2/2009 |

* cited by examiner

*Primary Examiner* — Tu B Hoang
*Assistant Examiner* — Thomas Ward
(74) *Attorney, Agent, or Firm* — Greer Burns & Crain Ltd.

(57) ABSTRACT

A laser beam applying apparatus includes a laser beam oscillating unit, a focusing lens, and a diffractive optic element provided between the laser beam oscillating unit and the focusing lens for defining the spot shape of the laser beam oscillated by the laser beam oscillating unit. A zeroth-order light removing unit removes zeroth-order light emerging from the diffractive optic element and leaves first-order light whose spot shape has been defined by the diffractive optic element and the focusing lens. A first prism has an incident surface and an emergent surface inclined with respect to the incident surface. A second prism has a zeroth-order light reflecting surface for reflecting the zeroth-order light and a first-order light emerging surface from which the first-order light emerges. A damper absorbs the zeroth-order light reflected on the zeroth-order light reflecting surface of the second prism.

3 Claims, 4 Drawing Sheets

LASER BEAM APPLYING APPARATUS

BACKGROUND OF THE INVENTION

1. Field of the Invention

The present invention relates to a laser beam applying apparatus for applying a laser beam to a workpiece such as a semiconductor wafer and an optical device wafer.

2. Description of the Related Art

In a semiconductor device fabrication process, a plurality of crossing division lines called streets are formed on the front side of a substantially disk-shaped silicon substrate to thereby partition a plurality of regions where semiconductor devices such as ICs and LSIs are respectively formed, thus forming a semiconductor wafer. The semiconductor wafer is cut along the streets to thereby divide the regions where the semiconductor devices are formed from each other, thus obtaining individual semiconductor chips. Further, an optical device wafer is provided by forming photodetectors such as photodiodes or light emitting devices such as laser diodes on the front side of a sapphire substrate. The optical device wafer is also cut along the streets to obtain individual optical devices divided from each other, such as photodiodes and laser diodes, which are widely used in electric equipment.

As a method of dividing a wafer such as a semiconductor wafer and an optical device wafer along the streets, there has been proposed a method including the steps of applying a pulsed laser beam having an absorption wavelength to the wafer along the streets to thereby form laser processed grooves on the wafer along the streets and next breaking the wafer along the laser processed grooves. Further, there has been proposed a laser processing apparatus in which the spot shape of the laser beam is formed into an elliptical shape to improve a processing accuracy. This laser processing apparatus includes spot shaping means provided by a cylindrical lens to form the spot shape of the laser beam into an elliptical shape (see Japanese Patent Laid-open No. 2006-289388, for example). As a method of forming the spot shape of the laser beam into a predetermined shape with a relatively simple configuration, the use of a diffractive optic element (DOE) is also known.

SUMMARY OF THE INVENTION

In the method of forming the spot shape of the laser beam into a predetermined shape by using a diffractive optic element, first-order light is formed by the diffractive optic element to thereby form the spot shape of the laser beam into the predetermined shape, and zeroth-order light not formed into the first-order light is also applied to the workpiece, causing a reduction in processing performance.

It is therefore an object of the present invention to provide a laser beam applying apparatus which can form the first-order light by using a diffractive optic element to form the spot shape of the laser beam into a predetermined shape and can remove the zeroth-order light not formed into the first-order light.

In accordance with an aspect of the present invention, there is provided a laser beam applying apparatus including laser beam oscillating means for oscillating a laser beam; a focusing lens for focusing the laser beam oscillated by the laser beam oscillating means; a diffractive optic element provided between the laser beam oscillating means and the focusing lens for defining the spot shape of the laser beam oscillated by the laser beam oscillating means; and zeroth-order light removing means for removing zeroth-order light emerged from the diffractive optic element and leading only first-order light whose spot shape has been defined by the diffractive optic element to the focusing lens; the zeroth-order light removing means including a first prism having an incident surface on which the first-order light and the zeroth-order light are incident and an emergent surface from which the first-order light and the zeroth-order light emerge so as to be angularly shifted from each other, the emergent surface being inclined with respect to the incident surface; a second prism having a zeroth-order light reflecting surface for allowing the incidence of the first-order light emerged from the emergent surface of the first prism and reflecting the zeroth-order light emerged from the emergent surface of the first prism and a first-order light emerging surface from which the first-order light emerges; and a damper for absorbing the zeroth-order light reflected on the zeroth-order light reflecting surface of the second prism.

Preferably, the incident surface of the first prism is set so that the first-order light passed through the diffractive optic element is perpendicularly incident on the incident surface; the emergent surface of the first prism and the zeroth-order light reflecting surface of the second prism are set parallel to each other; the incident surface of the first prism and the first-order light emerging surface of the second prism are set parallel to each other; and the first-order light whose spot shape has been defined by the diffractive optic element is led to the focusing lens by the zeroth-order light removing means so as to maintain a similar spot shape. Preferably, an angular separation coating is formed on the zeroth-order light reflecting surface of the second prism.

The laser beam applying apparatus according to the present invention includes the diffractive optic element provided between the laser beam oscillating means and the focusing lens for defining the spot shape of the laser beam oscillated by the laser beam oscillating means and further includes the zeroth-order light removing means for removing the zeroth-order light emerged from the diffractive optic element and leading only the first-order light whose spot shape has been defined by the diffractive optic element to the focusing lens. The zeroth-order light removing means includes the first prism having the incident surface on which the first-order light and the zeroth-order light are incident and the emergent surface from which the first-order light and the zeroth-order light emerge so as to be angularly shifted from each other, the emergent surface being inclined with respect to the incident surface and further includes the second prism having the zeroth-order light reflecting surface for allowing the incidence of the first-order light emerged from the emergent surface of the first prism and reflecting the zeroth-order light emerged from the emergent surface of the first prism and the first-order light emerging surface from which the first-order light emerges. The zeroth-order light removing means further includes the damper for absorbing the zeroth-order light reflected on the zeroth-order light reflecting surface of the second prism. With this configuration, the zero-order light removing means removes the zeroth-order light not formed into the first-order light whose spot shape has been defined by the diffractive optic element. Accordingly, it is possible to prevent a reduction in processing performance due to the application of the zeroth-order light.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENT

Figure 1:
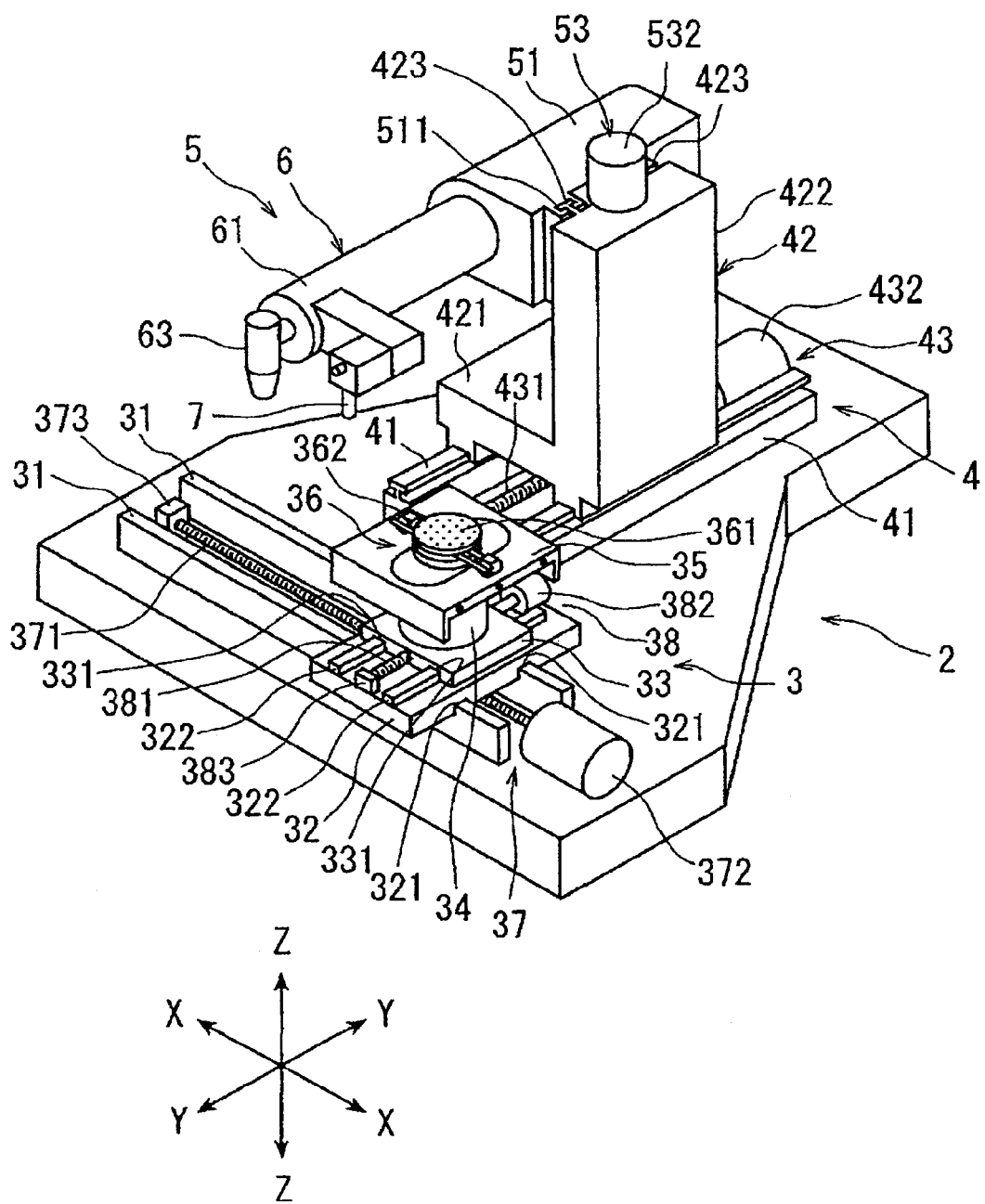
FIG. 1 is a perspective view of a laser processing machine including a laser beam applying apparatus according to the present invention.

A preferred embodiment of the laser beam applying apparatus according to the present invention will now be described in detail with reference to the attached drawings. FIG. 1 is a perspective view of a laser processing machine including a laser beam applying apparatus according to a preferred embodiment of the present invention. The laser processing machine shown in FIG. 1 includes a stationary base 2, a chuck table mechanism 3 for holding a workpiece, the chuck table mechanism 3 being provided on the stationary base 2 so as to be movable in a feeding direction (X direction) shown by an arrow X, a laser beam applying unit supporting mechanism 4 provided on the stationary base 2 so as to be movable in an indexing direction (Y direction) shown by an arrow Y perpendicular to the X direction, and a laser beam applying unit 5 provided on the laser beam applying unit supporting mechanism 4 so as to be movable in a focal position adjusting direction (Z direction) shown by an arrow Z perpendicular to a holding surface of a chuck table to be hereinafter described.

The chuck table mechanism 3 includes a pair of guide rails 31 provided on the stationary base 2 so as to extend parallel to each other in the X direction, a first slide block 32 provided on the guide rails 31 so as to be movable in the X direction, a second slide block 33 provided on the first slide block 32 so as to be movable in the Y direction, a cover table 35 supported by a cylindrical member 34 standing on the second slide block 33, and a chuck table 36 as workpiece holding means. The chuck table 36 has a vacuum chuck 361 formed of a porous material. A workpiece such as a disk-shaped semiconductor wafer is adapted to be held under suction on the vacuum chuck 361 as a workpiece holding surface by operating suction means (not shown). The chuck table 36 is rotatable by a pulse motor (not shown) provided in the cylindrical member 34. Further, the chuck table 36 is provided with clamps 362 for fixing an annular frame supporting the wafer as described later.

The lower surface of the first slide block 32 is formed with a pair of guided grooves 321 for slidably engaging the pair of guide rails 31 mentioned above. A pair of guide rails 322 are provided on the upper surface of the first slide block 32 so as to extend parallel to each other in the Y direction. Accordingly, the first slide block 32 is movable in the X direction along the guide rails 31 by the slidable engagement of the guided grooves 321 with the guide rails 31. The chuck table mechanism 3 according to the embodiment shown in the figure further includes feeding means 37 provided by a ball screw mechanism for moving the first slide block 32 in the X direction along the guide rails 31. The feeding means 37 includes an externally threaded rod 371 extending parallel to the guide rails 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31 by operating the pulse motor 372 to normally or reversely rotate the externally threaded rod 371.

The lower surface of the second slide block 33 is formed with a pair of guided grooves 331 for slidably engaging the pair of guide rails 322 provided on the upper surface of the first slide block 32 as mentioned above. Accordingly, the second slide block 33 is movable in the Y direction along the guide rails 322 by the slidable engagement of the guided grooves 331 with the guide rails 322. The chuck table mechanism 3 according to the embodiment shown in the figure further includes first indexing means 38 provided by a ball screw mechanism for moving the second slide block 33 in the Y direction along the guide rails 322. The first indexing means 38 includes an externally threaded rod 381 extending parallel to the guide rails 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322 by operating the pulse motor 382 to normally or reversely rotate the externally threaded rod 381.

The laser beam applying unit supporting mechanism 4 includes a pair of guide rails 41 provided on the stationary base 2 so as to extend parallel to each other in the Y direction and a movable support base 42 provided on the guide rails 41 so as to be movable in the Y direction. The movable support base 42 is composed of a horizontal portion 421 slidably supported to the guide rails 41 and a vertical portion 422 extending vertically upward from the upper surface of the horizontal portion 421. Further, a pair of guide rails 423 are provided on one side surface of the vertical portion 422 so as to extend parallel to each other in the Z direction. The laser beam applying unit supporting mechanism 4 according to the embodiment shown in the figure further includes second indexing means 43 provided by a ball screw mechanism for moving the movable support base 42 in the Y direction along the guide rails 41. The second indexing means 43 includes an externally threaded rod 431 extending parallel to the guide rails 41 so as to be interposed therebetween and a pulse motor 432 as a drive source for rotationally driving the externally threaded rod 431. The externally threaded rod 431 is rotatably supported at one end thereof to a bearing block (not shown) fixed to the stationary base 2 and is connected at the other end to the output shaft of the pulse motor 432 so as to receive the torque thereof. The externally threaded rod 431 is engaged with a tapped through hole formed in an internally threaded block (not shown) projecting from the lower surface of the horizontal portion 421 at a central portion thereof. Accordingly, the movable support base 42 is moved in the Y direction along the guide rails 41 by operating the pulse motor 432 to normally or reversely rotate the externally threaded rod 431.

The laser beam applying unit 5 includes a unit holder 51 and a pulsed laser beam applying apparatus 6 mounted to the unit holder 51. The unit holder 51 is formed with a pair of guided grooves 511 for slidably engaging the pair of guide rails 423 provided on the vertical portion 422 of the movable support base 42. Accordingly, the unit holder 51 is supported to the movable support base 42 so as to be movable in the Z direction by the slidable engagement of the guided grooves 511 with the guide rails 423.

The laser beam applying unit 5 further includes focal position adjusting means 53 for moving the unit holder 51 along the guide rails 423 in the Z direction. Like the feeding means 37, the first indexing means 38, and the second indexing means 43, the focal position adjusting means 53 is provided by a ball screw mechanism. That is, the focal position adjusting means 53 includes an externally threaded rod (not shown) extending parallel to the guide rails 423 so as to be interposed therebetween and a pulse motor 532 as a drive source for rotationally driving this externally threaded rod. Accordingly, the unit holder 51 and the pulsed laser beam applying apparatus 6 are moved in the Z direction along the guide rails 423 by operating the pulse motor 532 to normally or reversely rotate this externally threaded rod. In this preferred embodiment, when the pulse motor 532 is normally operated, the pulsed laser beam applying apparatus 6 is moved upward, whereas when the pulse motor 532 is reversely operated, the pulsed laser beam applying apparatus 6 is moved downward.

The pulsed laser beam applying apparatus 6 includes a cylindrical casing 61 fixed to the unit holder 51 so as to extend in a substantially horizontal direction. An imaging means 7 is mounted on a front end portion of the cylindrical casing 61. The imaging means 7 functions to detect a subject area of the workpiece to be laser-processed by the pulsed laser beam applying apparatus 6. The imaging means 7 includes an illuminating means for illuminating the workpiece, an optical system for capturing an area illuminated by the illuminating means, and an imaging device (CCD) for imaging the area captured by the optical system. An image signal output from the imaging means 7 is transmitted to a control means (not shown).

Figure 2:
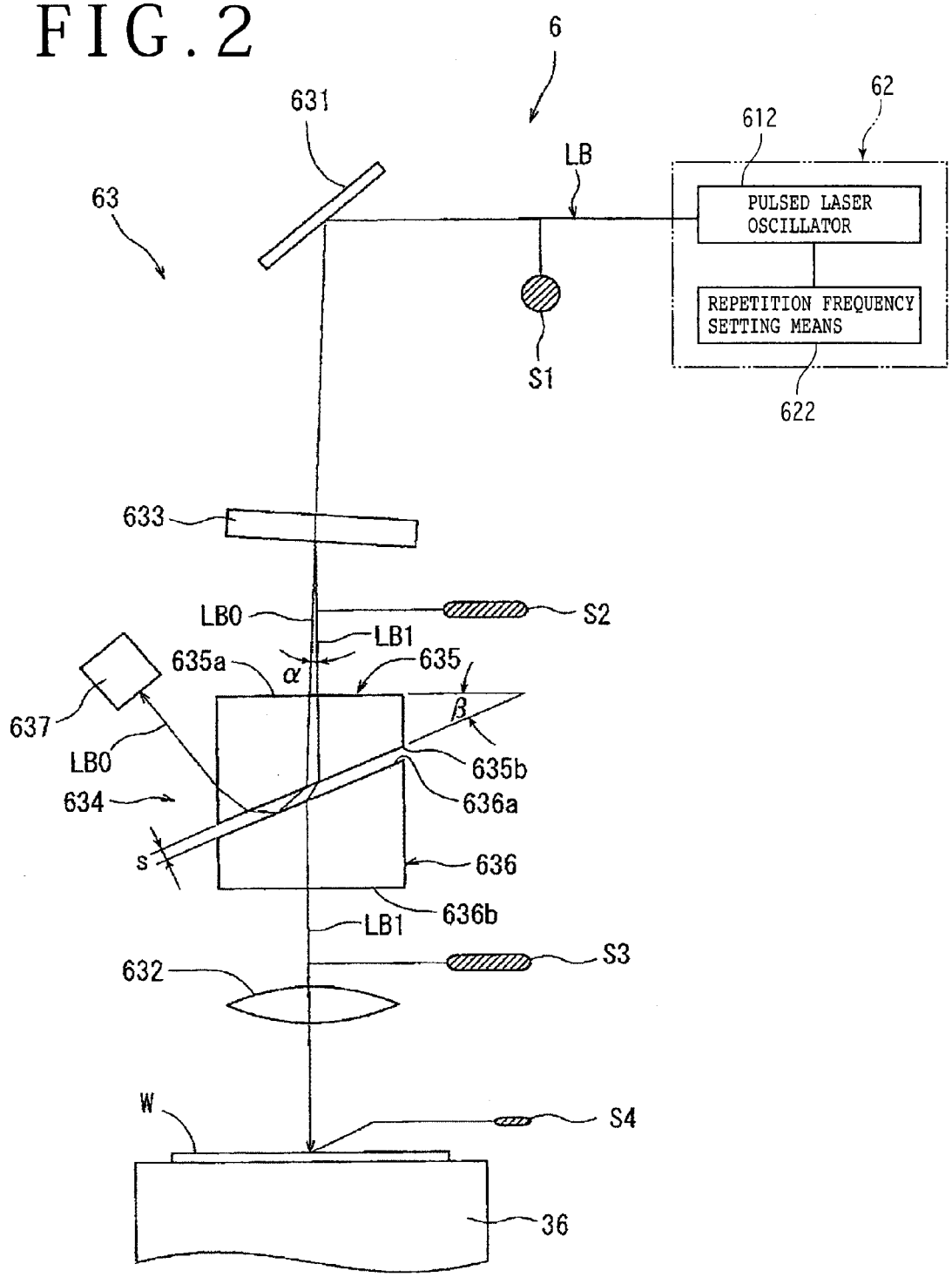
FIG. 2 is a schematic diagram showing the configuration of the laser beam applying apparatus according to the present invention.

As shown in FIG. 2, the pulsed laser beam applying apparatus 6 includes a pulsed laser beam oscillating means 62 provided in the casing 61 for oscillating a pulsed laser beam LB and a focusing means 63 for focusing the pulsed laser beam LB oscillated by the pulsed laser beam oscillating means 62 and applying this pulsed laser beam LB to a workpiece W held on the chuck table 36. The pulsed laser beam oscillating means 62 is composed of a pulsed laser oscillator 621 provided by a YAG laser oscillator or a YVO4 laser oscillator and a repetition frequency setting means 622 connected to the pulsed laser oscillator 621. The pulsed laser oscillator 621 functions to oscillate the pulsed laser beam LB having a predetermined frequency set by the repetition frequency setting means 622. The repetition frequency setting means 622 functions to set a repetition frequency of the pulsed laser beam LB to be oscillated by the pulsed laser oscillator 621.

The focusing means 63 is mounted on a front end of the casing 61. The focusing means 63 includes a direction changing mirror 631 for changing a traveling direction of the pulsed laser beam LB oscillated by the pulsed laser beam oscillating means 62 to a downward direction (a direction perpendicular to the holding surface of the chuck table 36 as its upper surface) as viewed in FIG. 2, a focusing lens 632 for focusing the pulsed laser beam LB whose traveling direction has been changed by the direction changing mirror 631 and applying this pulsed laser beam LB to the workpiece W held on the chuck table 36, a diffractive optic element (DOE) 633 provided between the pulsed laser beam oscillating means 62 and the focusing lens 632 for defining a spot shape of the pulsed laser beam LB oscillated by the pulsed laser beam oscillating means 62, and a zeroth-order light removing means 634 for removing zeroth-order light emerged from the diffractive optic element 633 and leading only first-order light whose spot shape has been defined by the diffractive optic element 633 to the focusing lens 632.

In this preferred embodiment, the diffractive optic element 633 is configured so as to change the circular sectional shape S1 (spot shape) of the pulsed laser beam LB oscillated by the pulsed laser beam oscillating means 62 into an elliptical sectional shape S2. The diffractive optic element 633 thus configured functions to divide the pulsed laser beam LB having the circular sectional shape S1 oscillated by the pulsed laser beam oscillating means 62 into first-order light LB1 whose spot shape is defined as the elliptical sectional shape S2 and zeroth-order light LB0 not formed into the first-order light LB1. The first-order light LB1 and the zeroth-order light LB0 enter the zeroth-order light removing means 634 with a predetermined angle α defined between the lights LB1 and LB0.

The zeroth-order light removing means 634 includes a first prism 635 having an incident surface 635a on which the first-order light LB1 and the zeroth-order light LB0 are incident and an emergent surface 635b from which the first-order light LB1 and the zeroth-order light LB0 emerge so as to be angularly shifted from each other, the emergent surface 635b being inclined with respect to the incident surface 635a, a second prism 636 having a zeroth-order light reflecting surface 636a for allowing the incidence of the first-order light LB1 emerged from the emergent surface 635b of the first prism 635 and reflecting the zeroth-order light LB0 emerged from the emergent surface 635b of the first prism 635 and a first-order light emerging surface 636b from which the first-order light LB1 emerges, and a damper 637 for absorbing the zeroth-order light LB0 reflected on the zeroth-order light reflecting surface 636a of the second prism 636. The incident surface 635a of the first prism 635 is set so that the first-order light LB1 which passed through the diffractive optic element 633 is perpendicularly incident on the incident surface 635a. The emergent surface 635b of the first prism 635 and the zeroth-order light reflecting surface 636a of the second prism 636 are set parallel to each other with a spacing s defined therebetween and are inclined at an angle β with respect to the incident surface 635a of the first prism 635. This angle β is set so that the zeroth-order light LB0 emerged from the emergent surface 635b of the first prism 635 is reflected on the zeroth-order light reflecting surface 636a of the second prism 636 and that the first-order light LB1 emerged from the emergent surface 635b of the first prism 635 is allowed to enter the second prism 636. Further, an angular separation coating is formed on the zeroth-order light reflecting surface 636a of the second prism 636, so as to reflect the zeroth-order light LB0 and allow the incidence of the first-order light LB1 with a slight angular difference. As an agent for forming the angular separation coating, $MgF_2$, polyethylene terephthalate (PET), and triacetyl cellulose (TAC) may be used, for example. Further, the incident surface 635a of the first prism 635 and the first-order light emerging surface 636b of the second prism 636 are set parallel to each other. Thus, the zeroth-order light LB0 which passed through the diffractive optic element 633 is reflected by the zeroth-order light reflecting surface 636a of the second prism 636 in the zeroth-order light removing means 634 and then led to the damper 637. On the other hand, the first-order light LB1 whose spot shape has been defined as the elliptical shape S2 by the diffractive optic element 633 is led to the focusing lens 632 by the zeroth-order light removing means 634 so as to maintain a similar shape S3. The first-order light LB1 having the elliptical spot shape S3 thus led to the focusing lens 632 is focused by the focusing lens 632 and applied onto the workpiece W held on the chuck table 36 so as to form an elliptical spot S4.

Figure 3:
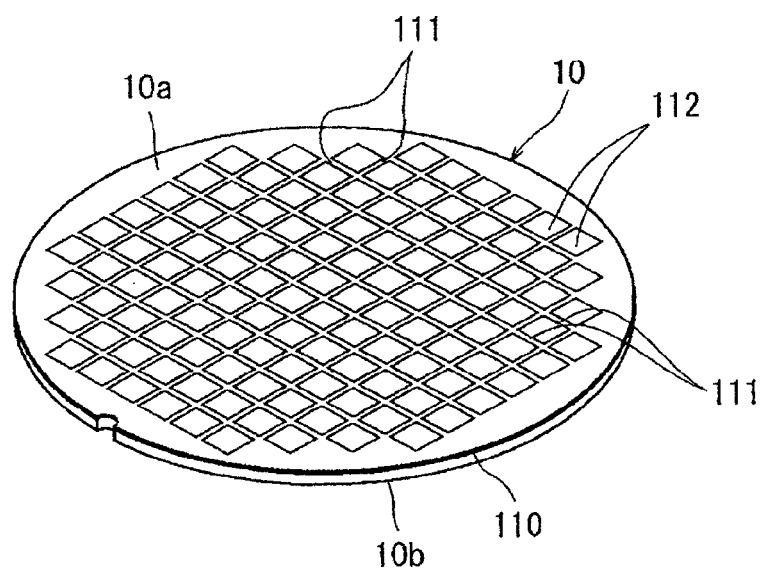
FIG. 3 is a perspective view of an optical device wafer as a workpiece.

The operation of the laser processing machine, according to the embodiment shown in the drawings, configured above will now be described. FIG. 3 is a perspective view of an optical device wafer as a workpiece to be processed by the laser processing machine described above. An optical device wafer 10 shown in FIG. 3 is composed of a sapphire substrate having a thickness of 100 μm, for example, and a light emitting layer (epitaxial layer) 110 having a thickness of 5 μm as an optical device layer laminated on the front surface of the sapphire substrate. The light emitting layer 110 is formed of a nitride semiconductor. The light emitting layer (epitaxial layer) 110 is partitioned by a plurality of crossing streets 111 into a plurality of regions in each of which an optical device 112 such as a light emitting diode and a laser diode is formed.

Figure 4:
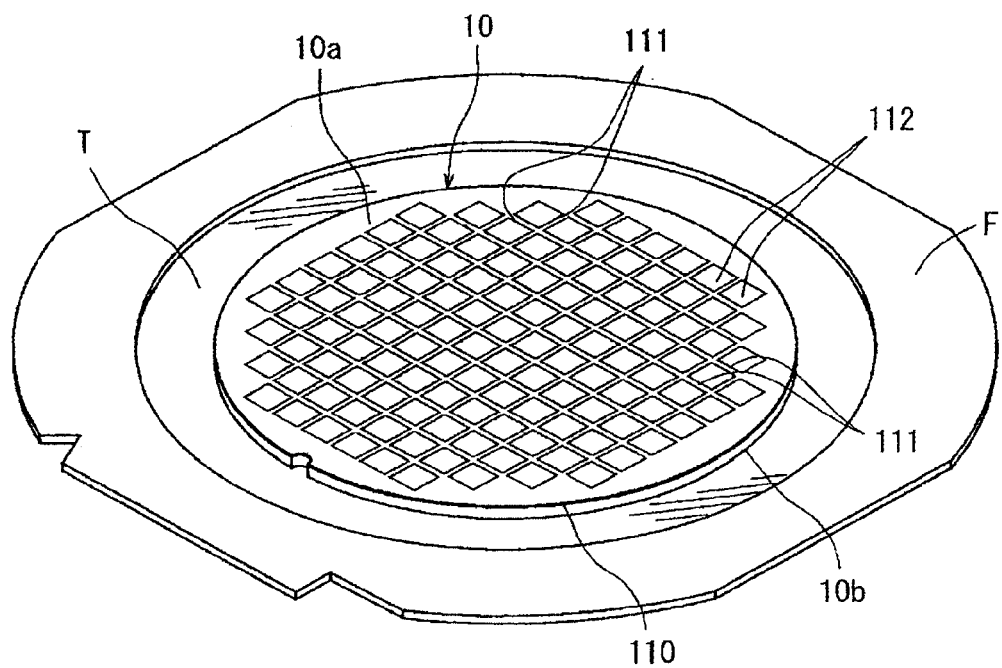
FIG. 4 is a perspective view showing a condition where the optical device wafer shown in FIG. 3 is attached to an adhesive tape supported to an annular frame.

In performing laser processing of the optical device wafer 10 along the streets 111 by using the laser processing machine shown above, the optical device wafer 10 is attached to an adhesive tape supported to an annular frame. More specifically, as shown in FIG. 4, a back side 10b of the optical device wafer 10 is attached to a front surface of an adhesive tape T supported to an annular frame F (wafer attaching step). Accordingly, the optical device wafer 10 is attached to the front surface of the adhesive tape T supported to the annular frame F so that a front side 10a of the optical device wafer 10 is oriented upward.

After performing the wafer attaching step mentioned above, the adhesive tape T on which the optical device wafer 10 is attached is placed on the chuck table 36 of the laser processing machine shown in FIG. 1. A suction means (not shown) is operated to thereby hold the optical device wafer 10 through the adhesive tape T on the chuck table 36 under suction (wafer holding step). Accordingly, the front side 10a of the optical device wafer 10 held on the chuck table 36 under suction is oriented upward. Further, the annular frame F supporting the optical device wafer 10 through the adhesive tape T is fixed by the clamps 362 provided on the chuck table 36. After performing the wafer holding step mentioned above, the chuck table 36 holding the optical device wafer 10 under suction is moved to a position directly below the imaging means 7 by operating the feeding means 37.

In the condition where the chuck table 36 is positioned directly below the imaging means 7, the imaging means 7 and the control means (not shown) perform an alignment operation for detecting a subject area of the optical device wafer 10 to be laser-processed. More specifically, the imaging means 7 and the control means perform image processing such as pattern matching for making the alignment of the streets 111 extending in a first direction on the optical device wafer 10 and the focusing means 63 of the pulsed laser beam applying apparatus 6 for applying the laser beam along the streets 111, thus performing the alignment of a laser beam applying position (alignment step). The imaging means 7 and the control means similarly perform the alignment operation for the other streets 111 extending in a second direction perpendicular to the first direction mentioned above on the optical device wafer 10.

Figure 5A:
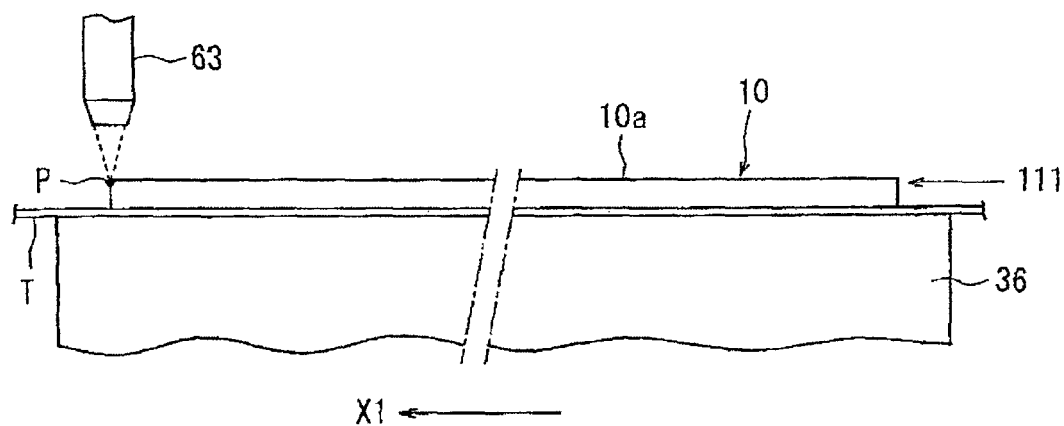
FIGS. 5A and 5B are sectional side views for illustrating a laser processed groove forming step of forming a laser processed groove on the optical device wafer shown in FIG. 3 by using the laser processing machine shown in FIG. 1.
Figure 5B:
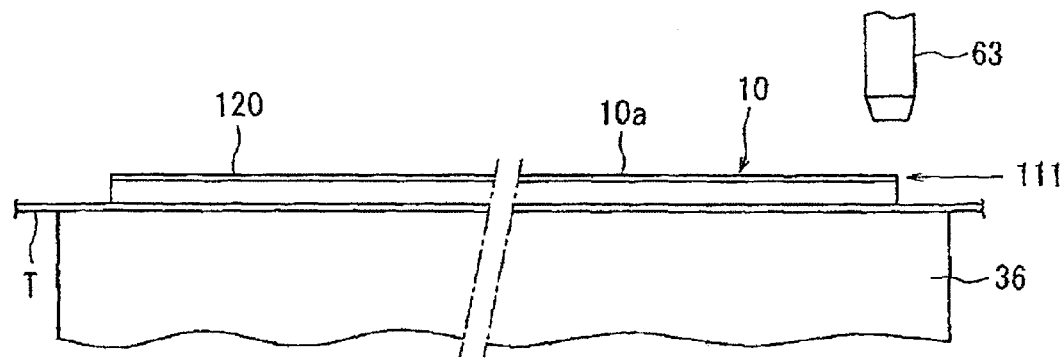

After performing the alignment operation to detect the streets 111 formed on the front side 10a of the optical device wafer 10 held on the chuck table 36 under suction, the feeding means 37 and the first indexing means 38 are operated to move the chuck table 36 to a position where one end (left end as viewed in FIG. 5A) of a predetermined one of the streets 111 extending in the first direction is positioned directly below the focusing means 63 of the pulsed laser beam applying apparatus 6 as shown in FIG. 5A. Thereafter, the pulsed laser beam applying apparatus 6 is operated to apply a pulsed laser beam having an absorption wavelength to the sapphire substrate constituting the optical device wafer 10 from the focusing means 63 while the chuck table 36 is moved in a direction shown by an arrow X1 in FIG. 5A at a predetermined feed speed (laser processed groove forming step). When the other end (right end as viewed in FIG. 5B) of the predetermined street 111 reaches the position directly below the focusing means 63 as shown in FIG. 5B, the application of the pulsed laser beam is stopped and the movement of the chuck table 36 is also stopped. In this laser processed groove forming step, a focal point P of the pulsed laser beam is set near the upper surface (the front side 10a) of the optical device wafer 10. As a result, a laser processed groove 120 is formed on the front side 10a of the optical device wafer 10 along the street 111.

For example, the laser processed groove forming step is performed under the following processing conditions.

Light source: YAG pulsed laser
Wavelength: 355 nm
Repetition frequency: 10 kHz
Average power: 3.5 W
Focused spot diameter: ellipse having a minor axis of 10 μm and a major axis of 200 μm
Work feed speed: 100 mm/sec After performing the laser processed groove forming step along all of the streets 111 extending in the first direction, the chuck table 36 is rotated 90° to similarly perform the laser processed groove forming step along all of the other streets 111 extending in the second direction perpendicular to the first direction.

In the laser processed groove forming step, the laser beam to be applied to the wafer 10 has an elliptical spot shape defined by the diffractive optic element 633. Accordingly, the laser processed grooves 120 can be formed with high processing accuracy. Further, the zeroth-order light LB0 not formed into the first-order light LB1 having an elliptical spot shape defined by the diffractive optic element 633 is removed by the zeroth-order light removing means 634. Accordingly, it is possible to prevent a reduction in processing performance due to the application of the zeroth-order light.

After performing the laser processed groove forming step along all of the crossing streets 111 on the wafer 10, the wafer 10 is transported to a position where a wafer dividing step is performed to divide the wafer 10 along the streets 111 where the laser processed grooves 120 are formed.

The present invention is not limited to the details of the above described preferred embodiments. The scope of the invention is defined by the appended claims and all changes and modifications as fall within the equivalence of the scope of the claims are therefore to be embraced by the invention.

What is claimed is:
1. A laser beam applying apparatus, comprising:
laser beam oscillating unit for oscillating a laser beam;
a focusing lens for focusing said laser beam oscillated by said laser beam oscillating unit;

a diffractive optic element provided between said laser beam oscillating unit and said focusing lens for defining a spot shape of said laser beam oscillated by said laser beam oscillating unit; and zeroth-order light removing unit for removing zeroth-order light emerged from said diffractive optic element and leaving only first-order light whose spot shape has been defined by said diffractive optic element to said focusing lens, said zeroth-order light removing unit including:

a first prism having an incident surface on which said first-order light and said zeroth-order light are incident and an emergent surface from which said first-order light and said zeroth-order light emerge so as to be angularly shifted from each other, said emergent surface being inclined with respect to said incident surface;

a second prism having a zeroth-order light reflecting surface for allowing the incidence of said first-order light emerged from said emergent surface of said first prism and reflecting said zeroth-order light emerged from said emergent surface of said first prism and a first-order light emerging surface from which said first-order light emerges; and a damper for absorbing said zeroth-order light reflected on said zeroth-order light reflecting surface of said second prism;

wherein said incident surface of said first prism is set so that said first-order light passed through said diffractive optic element is perpendicularly incident on said incident surface;

said emergent surface of said first prism and said zeroth-order light reflecting surface of said second prism are set parallel to each other;

said incident surface of said first prism and said first-order light emerging surface of said second prism are set parallel to each other; and said first-order light whose spot shape has been defined by said diffractive optic element is led to said focusing lens by said zeroth-order light removing unit so that the spot shape of said first-order light is maintained.

2. The laser beam applying apparatus according to claim 1, wherein an angular separation coating is formed on said zeroth-order light reflecting surface of said second prism.

3. The laser beam applying apparatus according to claim 1, wherein said incident surface of said first prism and said emergent surface of said first prism are at an angle greater than zero relative to each other.

* * * * *